United States Patent [19]
Tanaka et al.

[11] Patent Number: 5,891,941
[45] Date of Patent: Apr. 6, 1999

[54] FLUORORUBBER COMPOSITION AND MOLDED ARTICLE THEREOF

[75] Inventors: Hiroyuki Tanaka; Koji Matsumoto; Yutaka Ueta; Masayasu Tomoda, all of Settsu, Japan

[73] Assignee: Daikin Industries Ltd., Osaka, Japan

[21] Appl. No.: 669,287

[22] PCT Filed: Dec. 22, 1994

[86] PCT No.: PCT/JP94/02180

§ 371 Date: Jun. 28, 1996

§ 102(e) Date: Jun. 28, 1996

[87] PCT Pub. No.: WO95/18182

PCT Pub. Date: Jul. 6, 1995

[30] Foreign Application Priority Data

Dec. 29, 1993 [JP] Japan ................................. 5-351048

[51] Int. Cl.⁶ ........................................................ C08K 5/20
[52] U.S. Cl. ............................................................. 524/232
[58] Field of Search .................................................. 524/232

[56] References Cited

U.S. PATENT DOCUMENTS 5,430,103  7/1995  Ohata et al. ............................. 525/194

FOREIGN PATENT DOCUMENTS 2215839A   8/1990   Japan .
WO9320143  10/1993  WIPO .

OTHER PUBLICATIONS

Kunio Mori et al., Nippon Gomu Kyokaishi, vol. 62, No. 1, pp. 84–92 (1989) JP fixing between FR [fluorinated rubber] vulcanizates and metal plates and its prevention (Abstract 111:8698).

*Primary Examiner*—Peter D. Mulcahy
*Attorney, Agent, or Firm*—Birch, Stewart, Kolasch & Birch, LLP

[57] ABSTRACT

A fluororubber composition comprising a fluororubber, a vulcanizing agent and 0.1 to 5 wt. parts of a fatty acid monoamide per 100 wt. parts of said fluororubber. This fluororubber composition is excellent in mold releasability, and a molded article obtained by vulcanizing and molding the composition suffers less deterioration of mechanical properties caused by the addition of an internal mold release agent.

14 Claims, No Drawings

FLUORORUBBER COMPOSITION AND MOLDED ARTICLE THEREOF

FIELD OF THE INVENTION

The present invention relates to a fluororubber composition and a molded article of a fluororubber. In particular, the present invention relates to a fluororubber composition which is excellent in mold releasability in a vulcanizing molding step, and a molded article produced by vulcanizing said composition.

PRIOR ART

Examples of the conventional molding methods of a rubber are molding in a mold using a compression molding press (heat press), extrusion molding with an extruder, and so on. In the compression molding, a suitable mold release agent should be selected and used.

In general, in the case of the fluororubber, an external mold release agent which is coated on the mold such as a silicone emulsion type one or fluorine containing one is used. But, the external mold release agent should be applied on the mold surface before every shot, and may cause mold contamination. A contemplated solution for such problems is an internal mold release agent. However, the internal mold release agent cannot solve the problem of mold contamination satisfactorily. In addition, the internal mold release agent has drawbacks that it often causes fusing failure, deterioration of physical properties of the molded article, etc. For example, JP-A-2-281062 discloses compounding of a mixture of a metal salt of an aliphatic carboxylic acid and an aliphatic bisamide or a N-substituted aliphatic amide in a fluororubber. When such internal mold release agent is used, some problems arise, that is, a mold releasability is insufficient, the physical properties of the molded article are deteriorated greatly, and so on.

Further, the conventional internal mold release agent has a drawback that a "thin burr" adheres to the molded article so that defective molded articles are produced. That is, when the molded article of the fluororubber is produced by the compression molding or extrusion molding, an unnecessary part which is called as a "thin burr" remains on the molded article. Since the "thin burr" has tackiness, it bends and adheres to the molded article and its removal is difficult. Then, the molded article having the adhered thin burr is subjected to secondary vulcanization, whereby the product is defective.

SUMMARY OF THE INVENTION

Objects of the present invention are to provide a fluororubber which is excellent in mold releasability, does not deteriorate properties, in particular, compression set of a molded article thereof, and makes a "thin burr" non-tacky, and also to provide a molded article of a fluororubber having excellent properties.

As a result of the extensive study to solve the above problems, it has been found that when the fluororubber containing a fatty acid monoamide is vulcanized and molded, the above problems can be solved, and then the present invention has been completed.

According to one aspect of the present invention, there is provided a fluororubber composition comprising a fluororubber, a vulcanizing agent and 0.1 to 5 wt. parts of a fatty acid monoamide per 100 wt. parts of said fluororubber.

According to another aspect of the present invention, there is provided a fluororubber composition comprising 100 wt. parts of a fluororubber, 0.1 to 5 wt. parts of a fatty acid monoamide and 0.1 to 5 wt. parts of a fluorine-containing surfactant.

According to a further aspect of the present invention, there is provided a molded article of a fluororubber which is obtained by vulcanizing and molding the above composition.

DETAILED DESCRIPTION OF THE INVENTION

Herein, the fluororubber means a fluorinated elastomeric polymer, and includes all of the known fluororubbers. Typical examples of the fluororubber are vinylidene fluoride/hexafluoropropene base rubber (preferred molar ratio of vinylidene fluoride/hexafluoropropene being 45–95:55–5), vinylidene fluoride/tetrafluoroethylene/hexafluoropropene base rubber (preferred molar ratio of vinylidene fluoride/tetrafluoroethylene/hexafluoropropene being 45–90:1–35:5–50), vinylidene fluoride/chlorotrifluoroethylene base rubber, tetrafluoroethylene/propene base rubber, hexafluoropropene/ethylene base rubber, perfluoro(alkyl vinyl ether) (which may have plural ether bonds)/olefin (e.g. tetrafluoroethylene, ethylene, etc.) base rubber (preferred molar ratio of perfluoro(alkyl vinyl ether)/olefin being 15–75:85–25), fluorosilcone rubber, fluorophosphazene rubber, and so on. Preferred fluororubber is a copolymer comprising vinylidene fluoride monomer and at least one other monomer and containing 80 wt. % or less of vinylidene fluoride monomeric units. The fluororubber may be one comprising an iodine or bromine atom bonded to a polymer chain to increase a crosslinking reactivity (see JP-A-53-125491, JP-B-53-4115 and JP-A-59-20310).

Preferably, the fluororubber has a molecular weight of 3000 to 1,200,000 (measured by a gel permeation method).

Preferably, the fatty acid monoamide which is used to achieve the objects of the present invention is an unsaturated or saturated fatty acid monoamide having at least 12 carbon atoms, more preferably 12 to 24 carbon atoms. A fatty acid monoamide having 11 or less carbon atoms is less preferred since it has odor (unpleasant odor). A fatty acid monoamide having more than 24 carbon atoms is difficult to produce.

The saturated fatty acid monoamide is represented by the general formula:

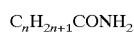

wherein n is an integer of 11 to 23. Preferred examples thereof are lauric acid amide, palmitic acid amide, stearic acid amide, behenic acid amide, and so on.

The unsaturated fatty acid monoamide is represented by the general formula:

wherein n is an integer of 11 to 23. Preferred examples thereof are oleic acid amide, erucic acid amide, ricinoleic acid amide, and so on.

The fatty acid amide which is used to achieve the objects of the present invention may be any of the saturated and unsaturated ones as described above. In particular, the unsaturated fatty acid monoamide having 18 to 24 carbon atoms is preferred, since it is excellent in mold releasability.

The fatty acid monoamides may be used in admixture of two or more of them.

The fatty acid monoamide to be used in the composition of the present invention is used in an amount of 0.1 to 5 wt. parts, preferably 0.2 to 2 wt. parts per 100 wt. parts of the fluororubber. When the amount of the monoamide is less than 0..1 wt. part, the mold releasing effect is not achieved, while when it exceeds 5 wt. parts, the properties of the molded article are deteriorated and also the defective molding occurs.

To improve the mold releasability, a fluorine-containing surfactant may be added to the composition of the present invention. In the case of the composition of the present invention, the use of the fluorine-containing surfactant can make the thin burr non-tacky and increase the effect of preventing the mold contamination when the mold is used for a long time. Preferred fluorine-containing surfactants are those described in JP-B-1-16431 (the compounds described from column 4, line 14 to column 17, line 34 of the Publication). Specific examples are compounds of the formulas:

and

wherein Rf is a fluoroalkyl group having 3 to 21 carbon atoms.

The fluorine-containing surfactant is used in an amount of 0 to 5 wt. parts, preferably 0.1 to 2 wt. parts per 100 wt. parts of the fluororubber.

The composition of the present invention may contain any of various additives which are used with conventional rubbers.

For example, as auxiliary fillers, there are used metal oxides (e.g. calcium oxide, titanium oxide, silicon oxide, zinc oxide, lead oxide, aluminum oxide, etc.), metal hydroxides (e.g. magnesium hydroxide, aluminum hydroxide, calcium hydroxide, zinc hydroxide, lead hydroxide etc.), carbonates (e.g. magnesium carbonate, aluminum carbonate, calcium carbonate, barium carbonate, etc.), silicates (e.g. magnesium silicate, calcium silicate, sodium silicate, aluminum silicate, etc.), sulfates (e.g. aluminum sulfate, calcium sulfate, barium sulfate, etc.), sulfides (e.g. molybdenum sulfide, ion sulfide, copper sulfide, etc.), diatomaceous earth, asbestos, lithopone (zinc sulfide/barium sulfate), graphite, carbon black, carbon fluoride, calcium fluoride, cokes, wollastonite, mica powder, glass powder, carbon fiber, quartz powder, and so on. These fillers may be used in combination of two or more of them.

An amount of the auxiliary filler is from 0 to 100 wt. parts, preferably from 0 to 50 wt. parts.

In addition, a colorant, a flame retardant, a stabilizer, a plasticizer, an oil-resistance improver, a scorch retarder, and so on may be added depending on the purposes.

As a vulcanizing manner, there are exemplified peroxide vulcanization using an organic peroxide, polyol vulcanization using a polyhydroxy compound, polyamine vulcanization using a polyamine compound, and polythiol vulcanization using a polythiol compound. Any one of these manners can be used in the present invention. Among them, the polyol vulcanization using the polyhydroxy compound is preferred.

A vulcanizing agent is used in an amount of 0.05 to 10 wt. parts, preferably 0.5 to 5 wt. parts per 100 wt. parts of the fluororubber.

As the organic peroxide compound, a compound which readily generates a peroxide radical by heating or in the presence of a redox system is preferred. Examples of the organic peroxide compound are 1,1-bis(tert.-butylperoxy)-3,5,5-trimethylcyclohexane, 2,5-dimethyl-2,5-dihydroxyperoxide, di-tert.-butylperoxide, tert.-butylcumylperoxide, dicumylperoxide, α,α-bis(tert.-butylperoxy)-p-diisopropylbenzene, 2,5-dimethyl-2,5-di(tert.-butylperoxy)hexane, 2,5-dimethyl-2,5-di(tert.-butylperoxy)hexane3, benzoylperoxide, tert.-butylperoxybenzene, 2,5-dimethyl-2,5-di(benzoylperoxy) hexane, tert.-butylperoxymaleic acid, tert.-butylperoxyisopropyl carbonate, and so on. Among them, the dialkyl type compounds are preferred. A kind and amount of the organic peroxide compound are selected according to an amount of active —O—O—groups, a decomposition temperature, etc.

When the organic peroxide compound is used, combined use of a crosslinking aid or co-crosslinking agent improves the effect of the peroxide compound greatly. Any crosslinking aid or co-crosslinking agent may be effective insofar as it has a reactivity with a peroxy radical and a monomer radical, and its kind is not limited. Preferred examples of the crosslinking aid or co-crosslinking agent are triallyl cyanurate, triallyl isocyanurate, triacryl formal, triallyl trimellitate, N,N'-m-phenylene bismaleimide, dipropargyl terephthalate, diallyl phthalate, tetraallyl terephthalamide, and vinyl group-containing siloxane oligomers such as polydimethylvinylsiloxane and polymethylphenylvinyl siloxane, etc. An amount of the crosslinking aid or co-crosslinking agent to be used is from 0.1 to 10 wt. parts, preferably 0.5 to 5 wt. parts per 100 wt. parts of the fluororubber.

As a polymer to be blend crosslinked with the fluororubber, there are used polymers which can be crosslinked with the peroxide such as silicone oil, silicone rubber, ethylene/vinyl acetate copolymer, 1,2-polybutadiene, fluorosilicone oil, fluorosilicone rubber, fluorophosphazene rubber, hexafluoropropylene/ethylene copolymer, tetrafluoroethylene/propylene copolymer, epichlorohydrin rubber including copolymers, urethane rubber, halogenated butyl rubber, nitrile-butadiene rubber, and the like.

An amount of the crosslinkable polymer is not limited, but should not be large enough to deteriorate the properties of the fluororubber.

As the polyhydroxy compound, there are used a polyhydroxy compound having a phenolic hydroxyl group:

a dihydroxy compound of the formula:

wherein Rf is a polyfluoroalkylene or perchlorofluoroalkylene group having 1 to 20 carbon atoms, their alkali metal salts, and mixtures thereof.

Preferred examples of such polyhydroxy compound are hydroquinone, 2,2-bis(4-hydroxyphenyl)propane, 2,2-bis(4-hydroxyphenyl)perfluoropropane, 2,2-bis(4-hydroxyphenyl)butane, 1,1-bis(4-hydroxyphenyl)methane, 4,4-dihydroxydiphenyl ether, $HOCH_2(CF_2)_2CH_2OH$, $HOCH_2CF_2CFH(CF_2)_2CFHCF_2CH_2OH$, $HOCH_2CH_2CH_2(CF_2)_3CH_2CH_2CH_2OH$, $HOCH_2CF_2CH_2(CF_2)_3CH_2CF_2CH_2OH$, and their alkali metal salts.

The polyamine compound may be a primary or secondary amine having at least two basic nitrogen atoms in a molecule. In many cases, it is used in a salt form which has a milder reactivity. Specific examples of the polyamine compound are alkylenediamines. Among them, ethylenediamine carbamate, hexamethylenediamine carbamate, 4,4'-diaminecyclohexylmethane carbamate, and so on are frequently used. A Schiff base such as N,N'-dicinnamylidene-1,6-hexamethylenediamine is often used also. Further, an aromatic polyamine compound which is less basic can be preferably used when it is used in combination with other basic compound. Examples of the other basic compound are diphenylguanidine, di-O-triguanidine, diphenylthiourea, 2-mercaptoimidazoline, a compound having a —$HN_2$ and/or —NH group in a molecule which is used as an accelerator for a synthetic rubber, and divalent metal hydroxides.

Examples of the polythiol compound are dimercaptodimethyl ether, dimercaptomethylsulfide, 1,6-hexanedithiol, ethylenebismercaptoacetate, 1,5-naphthalene dithiol, 4,4'-dimercaptodiphenyl, 2-substituted (anilino-, dibutylamino-, etc.)-4,6-dithiol-S-triazine, and their alkali metal salts.

Further, as a vulcanizing accelerator, there may be optionally used a tertiary amine, a tri-substituted amidine, a penta-substituted guanidine or their salt with an organic or inorganic acid, a quaternary ammonium salt, a quaternary phosphonium salt or a nitrogen-containing cyclic polyether. These crosslinking accelerators are described in JP-A-51-56854, JP-A-47-1387, JP-A-47-191, and JP-A-53-132858.

To compound the above components, a conventional open roll mill is used generally.

The fluororubber composition of the present invention can be vulcanized under vulcanizing conditions employed for vulcanizing a conventional fluororubber. For example, after milling the fluororubber composition, a mass of the composition is placed in a mold and heated at a temperature of 150° to 200° C., under pressure of 3 to 100 $kg/cm^2G$, in general 3 to 30 $kg/cm^2G$ for 3 to 60 minutes to effect press vulcanization and then, if necessary, maintained in an oven at a temperature of 180° to 260° C. for 0 to 24 hours to effect oven vulcanization, whereby the molded article is obtained.

The molded article of the present invention is useful as an O-ring, a packing, an automobile part, a general industrial part, and so on.

The present invention will be illustrated by the following Examples, which do not limit the scope of the present invention.

EXAMPLES

Examples 1–2 and Comparative Examples 1–8

A vinylidene fluoride (VdF)/hexafluoropropylene (HFP) copolymer (a molar ratio of VdF to HFP=78:22. Mooney viscosity $ML_{1+10}$(100° C.)=65) (100 wt. parts), bisphenol AF as a polyol vulcanizing agent (1.5 wt. parts), 8-benzyl-1,8-diazabicyclo-[5.4.0]undecenium chloride (DBU-B) as a vulcanizing accelerator (0.3 wt. part), carbon black N-990 (manufactured by CANCARB) (20 wt. parts), magnesium oxide (KYOWAMAG MA-150 manufactured by KYOWA Chemical Industries, Ltd.) (3 wt. parts), calcium hydroxide (CALDIC-2000 manufactured by OHMI Chemical Industries, Ltd.) (6 wt. parts) and one of mold release agents, namely, oleic acid amide (Example 1), stearic acid amide (Example 2), stearic acid (Comparative Example 2), sodium stearate (Comparative Example 3), zinc stearate (Comparative Example 4), myristic acid (Comparative Example 5), stearylamine (Comparative Example 6), stearyl isocyanurate (Comparative Example 7) or oleylamine (Comparative Example 8) (1 wt. part) were mixed and milled on an open roll mill at a room temperature for 30 minutes to obtain a composition for vulcanization. A composition containing the same components with no mold release agent was prepared (Comparative Example 1).

Then, using a hard chromium plated mold, a mass of each composition was press vulcanized under a pressing pressure of 30 tons, at a pressing temperature of 185° C. for 3 minutes to mold P-8 O-rings. The mold was for molding 65 pieces of P-8 O-rings.

After press vulcanization, the O-rings were peeled off from the mold by hands. Then, the number of O-rings which remained on the mold were counted and their percentage (%) per the whole number of the O-rings was used to evaluate the releasability of the composition from the mold. Then, the smaller remaining percentage means better mold releasability.

With the molded article, its tensile strength, elongation and hardness were measured according to JIS K 6301.

A compression set of the molded article was measured as follows:

An O-ring (an inner diameter of 23.7 mm, a wall diameter of 3.5 mm) was heated at 200° C. for 70 hours with pressing it by 25 %. Thereafter, the compression set was measured by the method B of ASTM D-396–61.

The results are shown in Table 1.

TABLE 1

| | Mold release agent[a] | Mold releasability (%) | Properties of molded article (original state) | | | |
|---|---|---|---|---|---|---|
| | | | Tensile strength ($kgf/cm^2$) | Elongation (%) | Hardness (JIS A) | Compression set (%) |
| Ex. 1 | Oleic acid amide | 0 | 176 | 260 | 70 | 33 |
| Ex. 2 | Stearic acid amide | 7 | 170 | 260 | 70 | 33 |
| C. Ex. 1 | — | 37 | 180 | 310 | 68 | 27 |
| C. Ex. 2 | Stearic acid | 54 | 183 | 260 | 71 | 39 |
| C. Ex. 3 | Sodium stearate | 25 | 149 | 220 | 72 | 40 |
| C. Ex. 4 | Zinc stearate | 72 | 171 | 260 | 72 | 39 |
| C. Ex. 5 | Myristic acid | 51 | 170 | 260 | 71 | 38 |
| C. Ex. 6 | stearylamine | 29 | 175 | 230 | 72 | 44 |
| C. Ex. 7 | Stearyl isocyanurate | 2 | 186 | 250 | 69 | 43 |
| C. Ex. 8 | Oleylamine | 37 | 180 | 230 | 72 | 47 |

Note:
[a]An amount was 1 wt. part per 100 wt. parts of the fluororubber.

Examples 3–9 and Comparative Examples 9–18

The vinylidene fluoride/hexafluoropropene copolymer used in Example 1 (100 wt. parts), bisphenol AF as a polyol vulcanizing agent (2 wt. parts), 8-benzyl-1,8-diazabicyclo-[5.4.0]undecenium chloride (DBU-B) as a vulcanizing accelerator (0.35 wt. part), carbon black N-990 (manufactured by CANCARB) (20 wt. parts), magnesium oxide (KYOWAMAG MA-150 manufactured by KYOWA Chemical Industries, Ltd.) (3 wt. parts), calcium hydroxide (CALDIC-2000 manufactured by OHMI Chemical Industries, Ltd.) (6 wt. parts) and erucic acid amide in an amount of 1 wt. part (Example 3), 0.75 wt. part (Example 4), 0.5 wt. part (Example 5), 0.45 wt. part (Example 6) or 0.25 wt. part (Example 7) were mixed and milled on an open roll mill at a room temperature for 30 minutes to obtain a composition for vulcanization. In the same manner as above but using, as a mold release agent, 1 wt. part of behehic acid amide (Example 8), lauric acid amide (Example 9), carnauba wax (Comparative Example 10), rice bran wax (Comparative Example 11), shellac wax (Comparative Example 12), N-oleyloleic acid amide (Comparative Example 13), N-stearyloleic acid amide (Comparative Example 15), N-stearyl-N'-stearylurea (Comparative Example 16), N-butyl-N'-stearylurea (Comparative Example 17) or N-phenyl-N'-stearylurea (Comparative Example 18) in place of erucic acid amide, or no mold release agent (Comparative Example 9), a composition for vulcanization was prepared.

Then, in the same manner as in Example 1, the composition was press vulcanized to obtain O-rings.

Mold releasability in the press molding, and properties of the molded article were evaluated in the same manners as in Example 1. The results are shown in Table 2.

TABLE 2

|  | Mold release agent[a)] (wt. part) | Mold releas-a-bility (%) | Tensile strength (kgf/cm²) | Elon-ga-tion (%) | Hard-ness (JIS A) | Com-pression set (%) |
|---|---|---|---|---|---|---|
| Ex. 3 | Erucic acid amide (1) | 0 | 176 | 220 | 71 | 21 |
| Ex. 4 | Erucic acid amide (0.75) | 0 | 170 | 210 | 71 | 21 |
| Ex. 5 | Erucic acid amide (0.5) | 3 | 172 | 210 | 71 | 20 |
| Ex. 6 | Erucic acid amide (0.45) | 3 | 175 | 200 | 70 | 20 |
| Ex. 7 | Erucic acid amide (0.25) | 10 | 168 | 200 | 70 | 20 |
| Ex. 8 | Behenic acid amide (1) | 8 | 173 | 200 | 71 | 21 |
| Ex. 9 | Lauric acid amide (1) | 6 | 178 | 190 | 70 | 20 |
| C. Ex. 9 | — | 28 | 160 | 210 | 70 | 20 |
| C. Ex. 10 | Carnauba wax (1) | 29 | 176 | 190 | 71 | 32 |
| C. Ex. 11 | Rice bran wax (1) | 34 | 166 | 200 | 70 | 31 |
| C. Ex. 12 | Shellac wax (1) | 12 | 167 | 190 | 71 | 30 |
| C. Ex. 13 | N-Oleyloleic acid amide (1) | 54 | 172 | 200 | 70 | 27 |
| C. Ex. 14 | N-Stearyloleic acid amide (1) | 48 | 169 | 200 | 71 | 26 |
| C. Ex. 15 | N-Oleylstearic acid amide (1) | 54 | 155 | 190 | 71 | 25 |
| C. Ex. 16 | N-Stearyl-N'-stearyl-urea (1) | 54 | 162 | 190 | 71 | 30 |
| C. Ex. 17 | N-Butyl-N'-stearyl-urea (1) | 34 | 169 | 190 | 72 | 27 |
| C. Ex. 18 | N-Phenyl-N'-stearyl-urea (1) | 46 | 171 | 180 | 72 | 28 |

From the results shown in Table 1 and 2, it is seen that oleic acid amide and erucic acid amide used according to the present invention have the excellent mold releasability.

The compression set is minimum when no mold release agent is used, and tends to increase when the mold release agent is added.

A tolerance limit of the increase of the mold compression set is 30% or less in comparison with the composition containing no mold release agent. The molded articles according to the present invention have the compression set within this tolerance limit.

Examples 10–11 and Comparative Example 19

To the composition of Example 5, the following fluorine-containing surfactant was added in an amount of 0.5 wt. part per 100 wt. parts of the fluororubber (Example 10).

Separately, a composition for vulcanization was prepared from the composition of Example 5 in the same manner as above but using 0.25 wt. part of erucic acid amide and 0.25 wt. % of the fluorine-containing surfactant (Example 11).

Properties of the compositions were evaluated in the same manners as in Example 1, and also a degree of mold contamination was evaluated using the same mold and press molding conditions.

The used fluorine-containing surfactant had the following structure:

When the mold surface was not contaminated after 200 times molding, the composition was ranked "Excellent". When the mold surface was slightly clouded after 100 times molding, it was ranked "Good". When the mold surface was severely clouded after 100 times molding, it was ranked "Bad".

The results are shown in Table 3.

For comparison, the same composition as that of Example 10 except that no erucic acid amide was added was prepared in Comparative Example 19. The results are also shown in Table 3.

In addition, with the compositions of Example 5 and Comparative Example 9, the mold contamination was evaluated. The results are shown in Table 3.

TABLE 3

|  | Mold release agent[a)] (wt. part) | Mold releasability (%) | Mold contamination | Tensile strength (kgf/cm²) | Elongation (%) | Hardness (JIS A) | Compression set (%) |
|---|---|---|---|---|---|---|---|
| C. Ex. 9 | — | 28 | Good | 160 | 210 | 70 | 20 |
| Ex. 1 | Erucic acid amide (0.5) | 3 | Good | 172 | 210 | 71 | 20 |
| C. Ex. 19 | F-cont. surfactant* (0.5) | 15 | Excellent | 175 | 210 | 71 | 20 |

TABLE 3-continued

|  | Mold release agent[a] (wt. part) | Mold releasability (%) | Mold contamination | Tensile strength (kgf/cm$^2$) | Elongation (%) | Hardness (JIS A) | Compression set (%) |
|---|---|---|---|---|---|---|---|
| | | | | Properties of molded article (original state) | | | |
| Ex. 10 | Erucic acid amide (0.5) F-cont. surfactant* (0.5) | 0 | Excellent | 171 | 210 | 71 | 21 |
| Ex. 11 | Erucic acid amide (0.25) F-cont. surfactant* (0.25) | 3 | Excellent | 173 | 210 | 71 | 20 |

Note:
*Fluorine-containing surfactant:

Rf—CH$_2$CHCH$_2$NCH$_2$COOK

As described above, the composition of the present invention is excellent in mold releasability, and the molded article obtained from the composition has less compression set than one obtained from a fluororubber composition comprising a conventional internal mold release agent. Further, the "thin burr" of the molded article is made non-tacky. In addition, the molded article can be adhered by vulcanization.

What is claimed is:

1. A fluororubber composition comprising a fluororubber, which is vinylidene fluoride/hexafluoropropene vinylidene fluoride/tetrafluoroethylene/hexafluoropropene, vinylidene fluoride/chlorotrifluoroethylene, tetrafluoroethylene/propene, hexafluoropropene/ethylene or perfluoro (alkyl vinyl ether)/olefin, a vulcanizing agent and 0.1 to 5 wt. parts of a fatty acid monoamide per 100 wt. parts of said fluororubber.

2. The fluororubber composition according to claim 1, wherein said fatty acid monoamide is an unsaturated fatty acid monoamide.

3. The fluororubber composition according to claim 2, wherein said unsaturated fatty acid monoamide is a compound represented by the general formula:

$$C_nH_{2n-1}CONH_2$$

wherein n is an integer of 11 to 23.

4. The fluororubber composition according to claim 2, wherein said unsaturated fatty acid monoamide is a compound represented by the general formula:

$$C_nH_{2n-1}CONH_2$$

wherein n is an integer of 17 to 23.

5. The fluororubber composition according to claim 2, wherein said unsaturated fatty acid monoamide is at least one compound selected from the group consisting of oleic acid amide, erucic acid amide and ricinoleic acid amide.

6. The fluororubber composition according to claim 1, wherein said fatty acid monoamide is a saturated fatty acid monoamide.

7. The fluororubber composition according to claim 6, wherein said saturated fatty acid monoamide is a compound represented by the general formula:

$$C_nH_{2n+1}CONH_2$$

wherein n is an integer of 11 to 23.

8. The fluororubber composition according to claim 6, wherein said saturated fatty acid monoamide is at least one compound selected from the group consisting of lauric acid amide, palmitic acid amide, stearic acid amide and behenic acid a amide.

9. The fluororubber composition according to claim 6, wherein said saturated fatty acid monoamide is a mixture of a saturated fatty acid monoamide and an unsaturated fatty acid monoamide.

10. The fluororubber composition according to claim 1, wherein an amount of said vulcanizing agent is from 0.05 to 10 wt. parts per 100 wt. parts of said fluororubber.

11. The fluororubber composition according to claim 1, wherein said vulcanizing agent is selected from the group consisting of organic peroxides, polyhydroxy compounds, polyamine compounds and polythiol compounds.

12. The fluororubber composition according to claim 11, wherein said vulcanizing agent is a polyhydroxy compound.

13. The fluororubber composition according to claim 1, which further comprises 0.1 to 5 wt. parts of a fluorine-containing surfactant per 100 wt. parts of said fluororubber.

14. A molded article obtained by vulcanizing and molding the composition claimed in claim 1.

* * * * *